United States Patent
Ou et al.

(10) Patent No.: US 10,838,621 B2
(45) Date of Patent: Nov. 17, 2020

(54) METHOD AND FLASH MEMORY CONTROLLER CAPABLE OF AVOIDING INEFFICIENT MEMORY BLOCK SWAP OR INEFFICIENT GARBAGE COLLECTION

(71) Applicant: Silicon Motion Inc., Hsinchu County (TW)

(72) Inventors: Hsu-Ping Ou, Hsinchu County (TW); Yu-Jen Huang, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 175 days.

(21) Appl. No.: 16/102,766

(22) Filed: Aug. 14, 2018

(65) Prior Publication Data

US 2020/0057570 A1 Feb. 20, 2020

(51) Int. Cl.
*G06F 3/06* (2006.01)
*G06F 12/10* (2016.01)

(52) U.S. Cl.
CPC .......... *G06F 3/0608* (2013.01); *G06F 3/0659* (2013.01); *G06F 3/0679* (2013.01); *G06F 12/10* (2013.01); *G06F 2212/1044* (2013.01); *G06F 2212/7201* (2013.01)

(58) Field of Classification Search
CPC .............................. G06F 3/0659; G06F 3/0608
See application file for complete search history.

(56) References Cited

U.S. PATENT DOCUMENTS

| | | | |
|---|---|---|---|
| 9,720,820 B2 * | 8/2017 | Chu | G06F 12/0246 |
| 2003/0169920 A1 | 9/2003 | Thomas | |
| 2005/0160316 A1 | 7/2005 | Shipton | |
| 2010/0228907 A1 * | 9/2010 | Shen | G11C 16/349 711/103 |
| 2011/0029715 A1 * | 2/2011 | Hu | G06F 12/0246 711/103 |
| 2011/0264847 A1 * | 10/2011 | Hsiao | G06F 12/0246 711/103 |
| 2017/0286289 A1 * | 10/2017 | Chu | G06F 12/0246 |
| 2017/0371781 A1 | 12/2017 | Choi | |

FOREIGN PATENT DOCUMENTS

| | | |
|---|---|---|
| CN | 106201329 A | 12/2016 |
| TW | I288327 | 10/2007 |
| TW | 201122812 A1 | 7/2011 |

OTHER PUBLICATIONS

Kang et al "Subpage-Aware Solid State Drive for Improving Lifetime and Performance" [online] Published IEEE Xplore Apr. 16, 2018 <URL: https://ieeexplore.ieee.org/document/8338090> (Year: 2018).*

* cited by examiner

Primary Examiner — Tammara R Peyton
(74) Attorney, Agent, or Firm — Winston Hsu

(57) ABSTRACT

A method of a flash memory controller coupled between a flash memory and an electronic device is provided. The flash memory has a plurality of blocks each having a plurality of pages. The method includes: detecting whether a data unit is formed by a repeated pattern, the data unit being transmitted from the electronic device and to be written into the flash memory or the data unit being read from the flash memory; and making a record of the repeated pattern at a field of the specific table if determining that the data unit is formed by the repeated pattern.

26 Claims, 4 Drawing Sheets

| Field \ Data | Address field | First field | Second field | ......... |
|---|---|---|---|---|
| 0 | ⋮ | 0 | Empty | ......... |
| 1 | ⋮ | 1 | XXXX | ......... |
| 2 | ⋮ | 0 | Empty | ......... |
| ⋮ | ⋮ | ⋮ | ⋮ | ......... |
|  |  |  |  |  |

FIG. 4

METHOD AND FLASH MEMORY CONTROLLER CAPABLE OF AVOIDING INEFFICIENT MEMORY BLOCK SWAP OR INEFFICIENT GARBAGE COLLECTION

BACKGROUND OF THE INVENTION

1. Field of the Invention

The invention relates to a flash memory controller mechanism, and more particularly to a method of a flash memory controller and the flash memory controller.

2. Description of the Prior Art

Generally speaking, the performance of a conventional flash memory device such as a memory card is usually limited due to an inefficient garbage collection or an inefficient memory block swap. The inefficient garbage collection or the inefficient memory block swap may result from many reasons. For example, in some memory card applications, a host device may write a sequence of the same data patterns such as bits '0' to all pages of a conventional memory card when is arranged to format the memory card. The pages storing the same data patterns are still regarded as valid pages for the conventional memory card even though the memory card is formatted. The inefficient garbage collection or the inefficient memory block swap results from all the pages or almost all pages are valid pages even though the memory card is formatted.

SUMMARY OF THE INVENTION

Therefore one of the objectives of the invention is to provide novel methods and corresponding flash memory controllers, to solve the above-mentioned problems.

According to embodiments of the invention, a method of a flash memory controller coupled between a flash memory and an electronic device is disclosed. The flash memory has a plurality of blocks each having a plurality of pages. The method comprises: detecting whether a data unit is formed by a repeated pattern, the data unit being transmitted from the electronic device and to be written into the flash memory or the data unit being read from the flash memory; and making a record of the repeated pattern at a field of the specific table when/if determining that the data unit is formed by the repeated pattern.

According to the embodiments, a method of a flash memory controller coupled between a flash memory and an electronic device is further disclosed. The flash memory has a plurality of blocks each having a plurality of pages. The method comprises: receiving a specific command from the electronic device, the specific command carrying a logical address to request a first data unit; accessing a field of a specific table to obtain a repeated pattern based on the logical address, the field of the specific table being within the flash memory and used for storing a record of the repeated pattern if the first data unit is formed by the repeated pattern; and replicating the repeated pattern to regenerate and output the first data unit to the electronic device. A data size of the repeated pattern obtained from the flash memory is smaller than a data size of the first data unit requested by the electronic device.

According to the embodiments, a method of a flash memory controller coupled between a flash memory and an electronic device is further disclosed. The flash memory has a plurality of blocks each having a plurality of pages. The method comprises: detecting whether a data unit is formed by a repeated pattern, the data unit being transmitted from the electronic device and to be written into the flash memory; and stopping incrementing a valid page count of a specific block when/if determining that the data unit is formed by the repeated pattern and is written into a page of the specific block in the flash memory.

According to the embodiments, a method of a flash memory controller coupled between a flash memory and an electronic device is further disclosed. The method comprises: detecting whether a data unit is formed by a repeated pattern, the data unit being read from the flash memory; and decrementing a valid page count of a specific block when/if determining that the data unit, read from a page of the specific block in the flash memory, is formed by the repeated pattern.

According to the embodiments, a flash memory controller coupled between a flash memory and an electronic device is disclosed. The flash memory has a plurality of blocks each having a plurality of pages. The flash memory controller comprises a buffer and a processing circuit. The buffer is configured for temporarily storing a data unit being transmitted from the electronic device and to be written into the flash memory or the data unit being read from the flash memory. The processing circuit is coupled to the buffer and is configured for detecting whether the data unit is formed by a repeated pattern, and for making a record of the repeated pattern at a field of the specific table when/if determining that the data unit is formed by the repeated pattern.

According to the embodiments, a flash memory controller coupled between a flash memory and an electronic device is further disclosed. The flash memory has a plurality of blocks each having a plurality of pages. The flash memory controller comprises a buffer and a processing circuit. The buffer is configured for temporarily storing a data unit read from the flash memory. The processing circuit is coupled to the buffer, and is configured for: receiving a specific command from the electronic device, the specific command carrying a logical address to request a first data unit; accessing a field of a specific table to obtain a repeated pattern based on the logical address, the field of the specific table being within the flash memory and used for storing a record of the repeated pattern if the first data unit is formed by the repeated pattern; and replicating the repeated pattern to regenerate and output the first data unit to the electronic device. A data size of the repeated pattern obtained from the flash memory is smaller than a data size of the first data unit requested by the electronic device.

According to the embodiments, a flash memory controller coupled between a flash memory and an electronic device is further disclosed. The flash memory has a plurality of blocks each having a plurality of pages. The flash memory controller comprises a buffer and a processing circuit. The buffer is configured for temporarily storing a data unit which is transmitted from the electronic device and to be written into the flash memory. The processing circuit is coupled to the buffer and is configured for detecting whether the data unit is formed by a repeated pattern, and for stopping incrementing a valid page count of a specific block when/if determining that the data unit is formed by the repeated pattern and is written into a page of the specific block in the flash memory.

According to the embodiments, a flash memory controller coupled between a flash memory and an electronic device is further disclosed. The flash memory has a plurality of blocks each having a plurality of pages. The flash memory controller comprises a buffer and a processing circuit. The buffer is configured for temporarily storing a data unit which is read from the flash memory. The processing circuit is coupled to the buffer, and is configured for detecting whether the data unit is formed by a repeated pattern, and for decrementing a valid page count of a specific block when/if determining that the data unit, read from a page of the specific block in the flash memory, is formed by the repeated pattern.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a simplified diagram of an implementation of the H2F table according to the embodiments of the invention.

DETAILED DESCRIPTION

The invention aims at providing a flash memory controller solution capable of avoiding inefficient garbage collection executions as far as possible. In a preferred embodiment, the provided solution can reduce the number of garbage collection execution.

Figure 1:
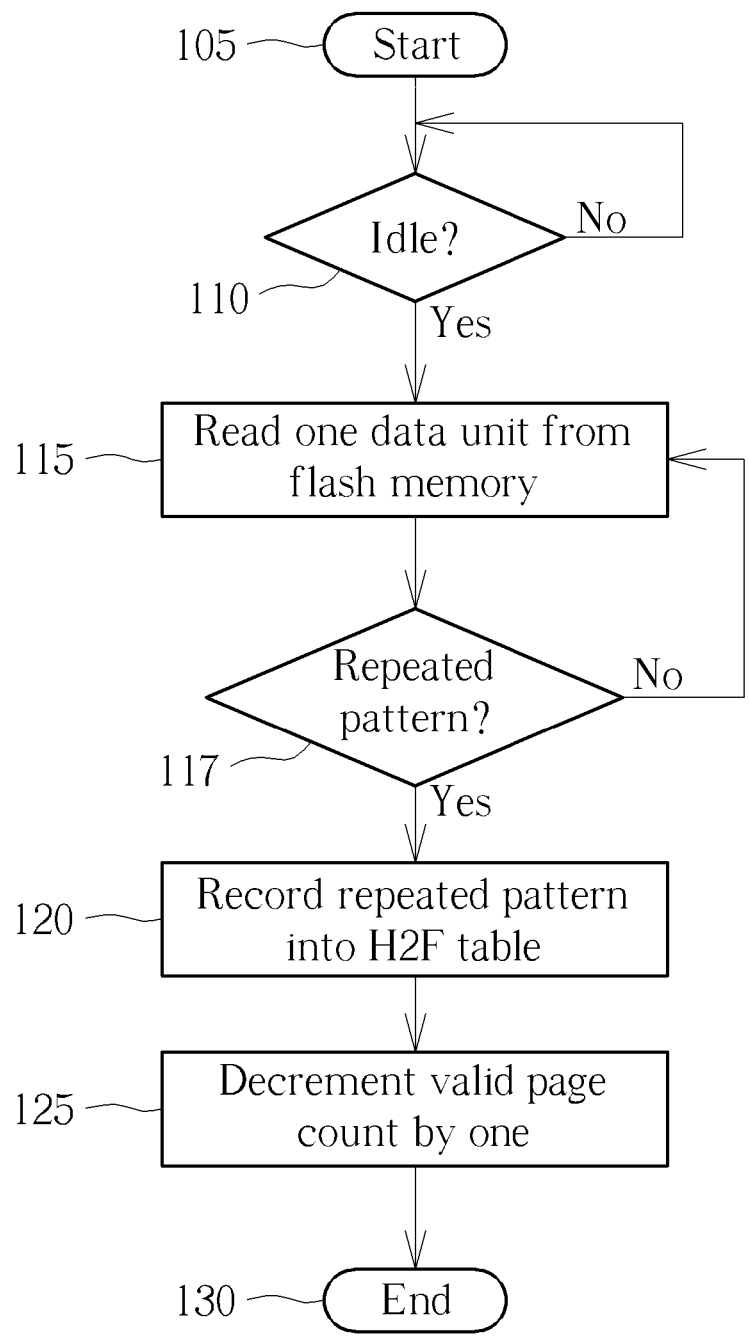
FIG. 1 is a flowchart diagram of a method of a flash memory controller according to a first embodiment of the invention.
Figure 2:
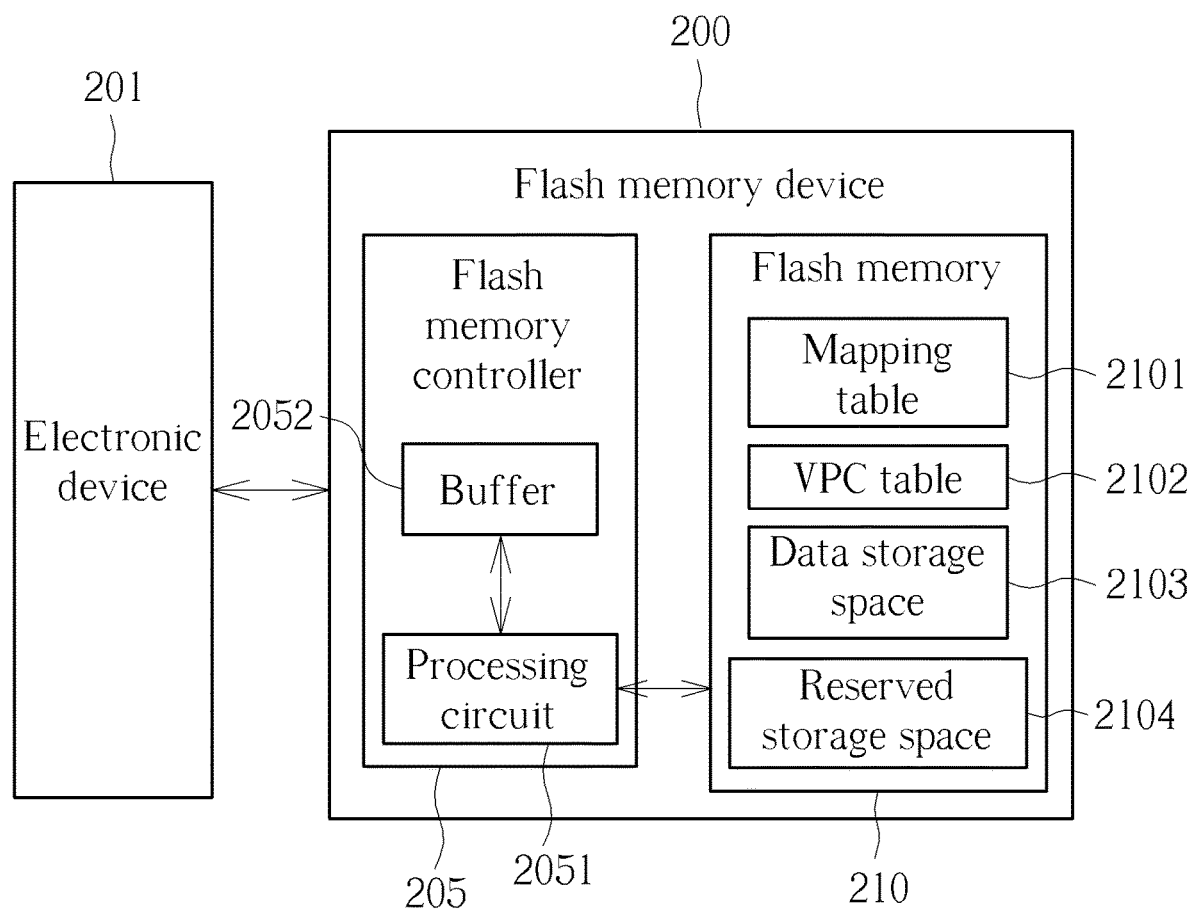
FIG. 2 is a block diagram showing a host device and a flash memory device comprising the flash memory controller of FIG. 1 according to the embodiment of FIG. 1.

Please refer to FIG. 1 in conjunction with FIG. 2. FIG. 1 is a flowchart diagram of a method of a flash memory controller 205 according to a first embodiment of the invention. FIG. 2 is a block diagram showing a host electronic device 201 and a flash memory device 200 comprising the flash memory controller 205 of FIG. 1 according to the embodiment of FIG. 1. As shown in FIG. 2, the flash memory device 200 comprises a flash memory controller 205 and a flash memory 210 wherein the flash memory controller 205 comprises a processing circuit 2051 and a buffer 2052. The flash memory 210 comprises a logical-to-physical address mapping table 2101, a valid page count (VPC) table 2102, a data storage space 2103, and a reserved storage space 2104 for block swap. The host device is for example an electronic device 201.

The logical-to-physical address mapping table 2101 may be called a host-to-flash (H2F) table which is used for recording mapping information between logical addresses and physical addresses. For example, the host device 201 transmits a write command to the flash memory controller 205 wherein the write command carries a logical address and is followed by a data unit such as one page data (but not limited). When/if receiving the write command and the data unit, the processing circuit 2051 converts the logical address into a physical address, records the physical address at an address field of H2F table 2101, and writes the page data into a page of the flash memory 210 based on such physical address.

In the embodiment, the processing circuit 2051 is arranged for detecting whether the data unit is formed by a repeated pattern and for making a record of the repeated pattern at a field of a specific table such as the H2F table 2101 when/if determining that the data unit is formed by the repeated pattern. For example, the processing circuit 2051 may make a record of the repeated pattern at a field of the specific table and write information content of the repeated pattern into a corresponding memory space of a memory device different from the specific table. Such memory device may be configured within the flash memory controller 205 or may be externally coupled to the controller 205.

Alternatively, in other embodiments, the processing circuit 2051 may directly stores the information content of the repeated patter at a field of the specific table. For storing the information content of a repeated pattern in the H2F table 2101, the H2F table 2101 for example comprises a plurality rows each having multiple fields. FIG. 4 is a simplified diagram of an implementation of the H2F table 2101 according to the embodiments of the invention. For instance, each row includes the address field for recording a physical address (having a block address and a page address) for a data unit such as one page data and a corresponding logical address, a first field for recording whether the data unit is formed by a repeated pattern, a second field for recording the content of the repeated pattern if the data unit is formed by the repeated pattern, and/or other field (s). For example, the first field of each row can be implemented by using a single bit wherein the bit can be configured as '0' by the processing circuit 2051 to indicate that the page data is not formed by a repeated pattern or configured as '1' by the processing circuit 2051 to indicate that the page data is formed by a repeated pattern. In addition, the second field of each row for example may be implemented using two bytes (i.e. one word) to record the content of a repeated pattern for a data unit. The second field is empty if the first field is marked as '0', and the second field records the information content of a repeated pattern such as 'XXXX' shown in FIG. 4 if the first field is marked as '1'.

The processing circuit 2051 may use only the first field mentioned above to store a record of a repeated pattern if a particular data unit is formed by such repeated pattern. That is, the processing circuit 2051 may employ the H2F table 2101 to record whether a data unit is formed by a repeated pattern and further use a different memory device to store the information content of the repeated pattern in a corresponding memory location/space of the different memory device. The different memory device can be configured within the flash memory controller 2051 or can be an externally connected memory device configured within the flash memory device 200. These modifications all fall within the scope of the invention.

It should be noted that an indication of a repeated pattern if detected by the processing circuit 2051 and/or its corresponding information content can be stored or recorded by various of kinds of mechanisms. All the modifications obey the spirit of the invention.

The VPC table 2102 comprises a plurality of valid page counts respectively corresponding to the blocks in the data storage space 2103. A valid page count is used for recording the number of valid pages of a corresponding block.

The data storage space 2103, i.e. user memory space, comprises a plurality of blocks each comprising a plurality of pages. The reserved storage space 2104 is used for system processing, block swap, or other processing.

In practice, the flash memory 210 can allocate different memory spaces for H2F table 2101, VPC table 2101, data storage space 2103, and reversed storage space 2104, respectively. However, this is not meant to be a limitation. In other embodiment, the H2F table 2101 and VPC table 2101 may be configured within the flash memory controller 205 or within another external memory circuit.

The buffer 2052 of flash memory controller 205 is used for temporarily storing data unit(s) transmitted from the host device and to be written into the flash memory 210 and/or data unit(s) read from the flash memory 210. For example, a data unit may be one page data of a page within the flash memory 210 or may be a portion of one page data. This is not meant to be a limitation. The processing circuit 2051 is arranged to perform flash memory controller operations to access the flash memory 210 based on the commands of host device 201 and/or to perform other operations.

Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: the flash memory controller 205 checks whether the flash memory 210 is idle? If the flash memory 210 is idle, the flow precedes to Step 115, otherwise, the flow proceeds to Step 110;

Step 115: the flash memory controller 205 reads or retrieves a data unit such as one page data from a page of a block within the data storage space 2103 of flash memory 210;

Step 117: the flash memory controller 205 checks/detects whether the page data is formed by a repeated pattern (repeated data pattern/type), i.e. a sequence of the same patterns; if the page data is not formed by a repeated pattern, then the flow proceeds to Step 115 and the flash memory controller 205 reads another data unit such as another page data from a different page for check, otherwise, the flow proceeds to step 120;

Step 120: the flash memory controller 205 writes and records the repeated pattern into a specific memory location of H2F table 2101 and marks a specific field of H2F table 2101, e.g. a uniform bit, to indicate that such page is formed by the repeated pattern which is recorded at the specific memory location of H2F table 2101;

Step 125: the flash memory controller 205 updates a valid page count within the VPC table 2102 for the above-mentioned block by decrementing the valid page count; and Step 130: End.

For example, in Step 105, if the flash memory 210 is idle over a particular time period such as 500 ms (but not limited), then the processing circuit 2051 determines that the flash memory 210 is in an idle state. If the flash memory 210 is not idle over the particular time period, then the processing circuit 2051 determines that the flash memory 210 is not idle. In addition, the processing circuit 2051 may be arranged to detect whether the flash memory controller 205 is idle. If the controller 205 is idle, the flow proceeds to Step 115; otherwise, the flow proceeds to Step 110.

Further, the processing circuit 2051 is arranged to detect/determine whether the host electronic device 201 is currently arranged to or hopes to access the flash memory 210. If detecting this, the processing circuit 2051 is arranged to stop the operations of detecting whether a data unit is formed by a repeated pattern. For example, in this situation, the processing circuit 2051 may stop all the steps in FIG. 1.

In Step 115, for instance, the processing circuit 2051 of flash memory controller 205 may employ and execute a direct memory access (DMA) operation to read one page data from a page of a block within the data storage space 2103 and then temporarily store the page data in the buffer 2052. In addition, the processing circuit 2051 employs the DMA operation upon the flash memory 210 to search a maximum value and a minimum value for the page data read back from the flash memory 210. If the flash memory controller 205 identifies that the maximum value is equal to the minimum value, then the flash memory controller 205 can determine that such page data is formed by a repeated pattern. Instead, if the flash memory controller 205 identifies that the maximum value is not equal to the minimum value, then the flash memory controller 205 can determine that such page data is not formed by a repeated pattern. However, the DMA operation and the operations for searching maximum and minimum values to find a repeated pattern are not meant to be limitations of the invention. In other embodiment, the flash memory controller 205 may employ other different operations to determine whether one page data is formed by a repeated pattern or not.

The processing circuit 2051 reads a data unit such as one page data from a page of a block within the data storage space 2103 when/if the flash memory 210 is idle. If determining that the read page data is formed by a repeated pattern, then the processing circuit 2051 of flash memory controller 205 is arranged to write the repeated pattern to the second field of a row (of H2F table 2101) corresponding to the physical address of the page to record the repeated pattern using the H2F table 2101.

It should be noted that in other embodiment the processing circuit 2051 may employ another different table to record the repeated pattern of the page data; this is not meant to be a limitation. For example, the another different table may be configured at the same or another different memory device.

The second field as mentioned above is used for recording the content of a repeated pattern of page data of one page. In addition, the processing circuit 2051 of flash memory controller 205 is arranged to mark the first field of such row of H2F table 2101 to indicate that the repeated pattern of the data page is recorded. For example, the first field may be implemented using a single bit named as uniform bit to indicate the repeated pattern.

Then, in Step 125, the processing circuit 2051 of flash memory controller 205 is arranged to decrements a valid page count of a block comprising the specific page by one. That is, the above-mentioned page formed by the repeated pattern is considered or treated as an invalid page, and its content can be cleared if needed.

When/if the electronic device 201 sends a command carrying a logical address to the flash memory controller 205 to request a first data unit such as page data of one page, the processing circuit 2051 is arranged to check whether the page data is formed by a repeated pattern, access the second field of the H2F table 2101 to obtain the repeated pattern based on the logical address if the page data is formed by the repeated pattern, replicate the repeated pattern to regenerate and output the first data unit to the electronic device 201. That is, the data size of the repeated pattern obtained from the flash memory 210 is smaller than that of the first data unit such one page data transmitted to the electronic device 201.

For example, the size of one page data may be equal to 16 KB, and the size of second field used for recording the content of a repeated pattern can be configured or designed as two bytes, one word length. For one page formed by a repeated pattern, the processing circuit 2051 can store the content of the repeated pattern at the second field of H2F table 2101, and the processing circuit 2051 regenerates one page data to the host device 201 by replicating the repeated pattern if the host device 201 requests the data of the page. By doing so, the flash memory controller 205 can generate correct data to the host device 201 if the host device requests as well as the valid page count of a block becomes smaller compared to the conventional scheme in a case which a sequence of repeated patterns is written into the flash memory 210. When/if the flash memory 210 is arranged to perform a memory block swap operation, such memory block swap operation can efficiently swap a block having page(s) formed by repeated pattern(s) with a reserved block within the reserved storage space 2104 since the block having page(s) formed by repeated pattern(s) corresponds to a smaller valid page count. This can avoid an inefficient garbage collection operation, and the performance of flash memory will not be degraded.

In some particular memory card applications such as a security digital card (but not limited), the electronic device 201 as a host device for example may sequentially write bit '0' into pages of all blocks in the flash memory 210 when/if the host device 201 is arranged to format the flash memory 210. When/if the flash memory controller 205 detects that page data of a page is formed by bit '0' (i.e. a repeated pattern), the flash memory controller 205 is arranged to write the bit '0' into the H2F table 2101 to record the content of bit '0' at the second field of H2F table 2101, and to decrement the valid page count (within the VPC table 2102) of a block to treat the page as an invalid page. In a preferred embodiment, data of the pages of blocks within the data storage space 2103 are formed by repeated patterns, i.e. bits '0', if the data storage space 2103 is formatted. All the pages of the blocks are treated as invalid pages, and the valid page counts of the blocks are zero.

Figure 3:
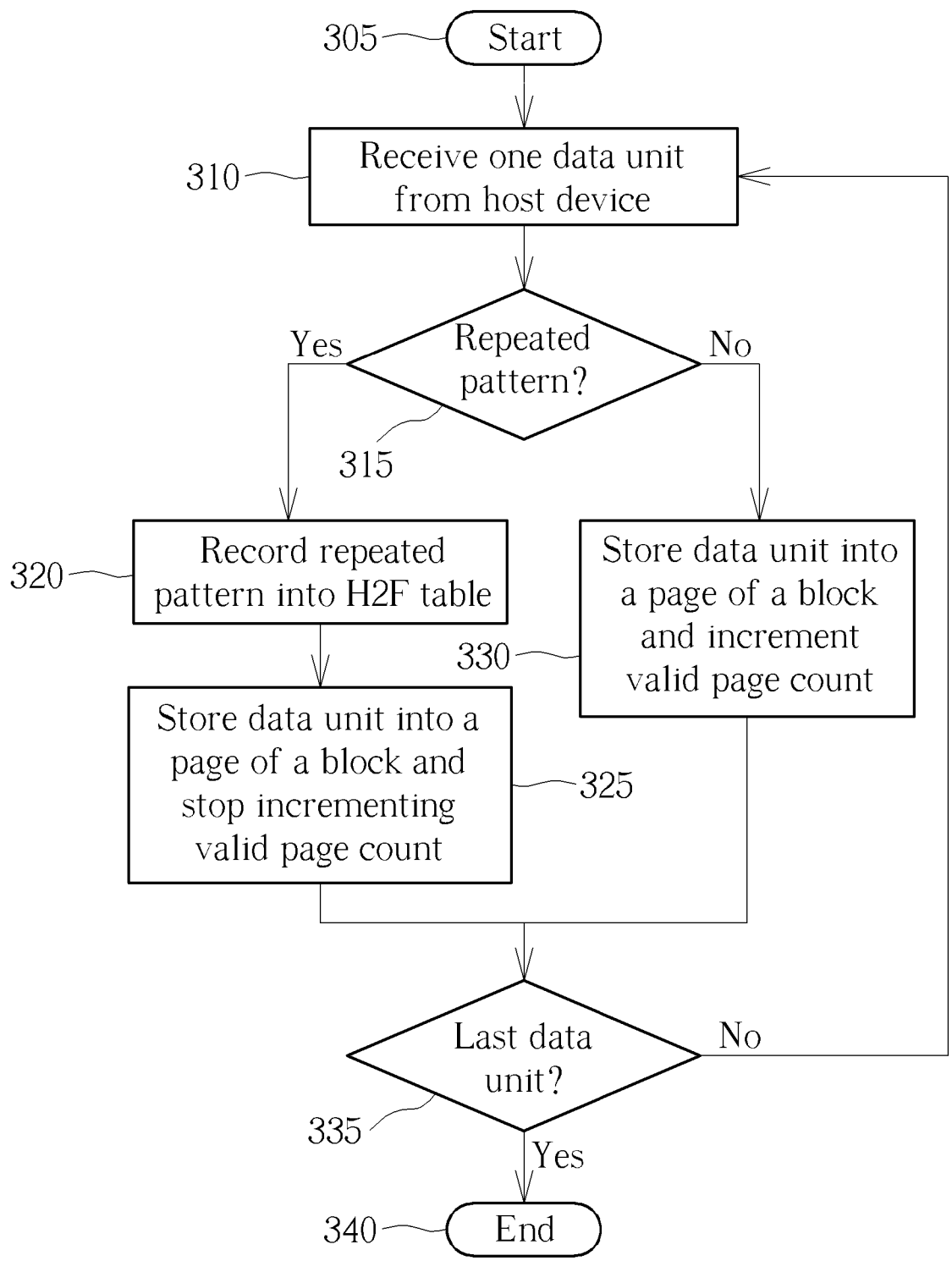
FIG. 3 is a flowchart diagram of a method of a flash memory controller according to a second embodiment of the invention.

In another embodiment, the flash memory controller 205 can be arranged to check whether one page data is formed by a repeated pattern when/if the host device 201 is being writing such page data or sequentially writing portions of such page data into the flash memory device 200. That is, the flash memory controller 205 can real-time check whether received/collected page data is formed by a repeated pattern. Please refer to FIG. 3, which is a flowchart diagram of a method of a flash memory controller 205 according to a second embodiment of the invention.

Step 305: Start;

Step 310: the flash memory controller 205 receives a data unit such as one page data sent from the host device 201 and temporarily stores the received data unit (e.g. one page data) in the buffer 2052;

Step 315: the flash memory controller 205 checks whether the data unit is formed by a repeated pattern; if the data unit is not formed by a repeated pattern, then the flow proceeds to Step 330, otherwise, the flow proceeds to Step 320;

Step 320: the flash memory controller 205 writes and records the repeated pattern into a specific memory location of H2F table 2101 and marks a specific field of H2F table 2101, e.g. a uniform bit, to indicate that such page is formed by the repeated pattern which is recorded at the specific memory location of H2F table 2101;

Step 325: the flash memory controller 205 stores the page data into a page of a block and does not increment the valid page count of the block;

Step 330: the flash memory controller 205 stores the page data into a page of a block and increments the valid page count of the block;

Step 335: the flash memory controller 205 determines whether the data unit sent from the host device 201 is the last data unit. If the data unit is the last data unit, the flow proceeds to Step 340, otherwise, the flow proceeds to Step 310 to receive a next data unit from the host device 201; and Step 340: End.

In Step 325, the flash memory controller 205 is arranged to store the page data into a page of a block and does not increment the valid page count of the block. That is, the valid page count is not incremented by one, and the valid page count of the block is not changed due to the data unit having the repeated pattern. The block has the smaller valid page count. Based on this scheme, an inefficient garbage collection execution can be avoided.

Further, it should be noted that in Step 310 the data unit sent from the host device 201 may be the size of one page data or may be a portion of one page data. For example, if the size of one page in the flash memory 210 is equal to 16 KB, then the data unit may be 16 KB or 4 KB (not limited).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a flash memory controller coupled between a flash memory and an electronic device, the flash memory having a plurality of blocks each having a plurality of pages, and the method comprises:
   detecting whether a data unit is formed by a repeated pattern, the data unit being transmitted from the electronic device and to be written into the flash memory or the data unit being read from the flash memory; and
   making a record of the repeated pattern at a field of a specific table if determining that the data unit is formed by the repeated pattern, and the making step comprises:
   writing information content of the repeated pattern into the field of the specific table if determining that the data unit is formed by the repeated pattern.

2. The method of claim 1, wherein the specific table is a logical-to-physical address mapping table within the flash memory.

3. The method of claim 1, further comprising:
   stopping incrementing a valid page count of a specific block if the data unit formed by the repeated pattern is written into a page of the specific block in the flash memory.

4. The method of claim 1, further comprising:
   decrementing a valid page count of a specific block if the data unit formed by the repeated pattern is read from a page of the specific block in the flash memory.

5. The method of claim 1, further comprising:
   marking another field of the specific table to indicate that the record of the repeated pattern has been made at the field of the specific table.

6. The method of claim 5, further comprising:
   reading the repeated pattern from the field of the specific table to replicate the repeated pattern for regenerating and outputting the data unit to the electronic device if the electronic device requests the data unit;
   wherein a data size of the repeated pattern is smaller than a data size of the data unit.

7. The method of claim 1, further comprising:
   writing information content of the repeated pattern into a memory space different from the specific table if determining that the data unit is formed by the repeated pattern.

8. The method of claim 7, further comprising:
   reading the repeated pattern from the memory space to replicate the repeated pattern for regenerating and outputting the data unit to the electronic device if the electronic device requests the data unit and the field of the specific table indicates the repeated pattern;
   wherein a data size of the repeated pattern is smaller than a data size of the data unit.

9. The method of claim 1, further comprising:
performing the detecting step if deciding that the flash memory controller is idle.

10. The method of claim 1, further comprising:
stopping the detecting step if detecting that the electronic device is arranged to access the flash memory.

11. A method of a flash memory controller coupled between a flash memory and an electronic device, the flash memory having a plurality of blocks each having a plurality of pages, and the method comprises:
receiving a specific command from the electronic device, the specific command carrying a logical address to request a first data unit;
accessing a field of a specific table to obtain a repeated pattern based on the logical address, the field of the specific table being within the flash memory and used for storing a record of the repeated pattern if the first data unit is formed by the repeated pattern; and
replicating the repeated pattern to regenerate and output the first data unit to the electronic device;
wherein a data size of the repeated pattern obtained from the flash memory is smaller than a data size of the first data unit requested by the electronic device.

12. A method of a flash memory controller coupled between a flash memory and an electronic device, the flash memory having a plurality of blocks each having a plurality of pages, and the method comprises:
detecting whether a data unit is formed by a repeated pattern, the data unit being transmitted from the electronic device and to be written into the flash memory; and
stopping incrementing a valid page count of a specific block if determining that the data unit is formed by the repeated pattern and is written into a page of the specific block in the flash memory.

13. A method of a flash memory controller coupled between a flash memory and an electronic device, the flash memory having a plurality of blocks each having a plurality of pages, and the method comprises:
detecting whether a data unit is formed by a repeated pattern, the data unit being read from the flash memory; and
decrementing a valid page count of a specific block if determining that the data unit, read from a page of the specific block in the flash memory, is formed by the repeated pattern.

14. A flash memory controller coupled between a flash memory and an electronic device, the flash memory having a plurality of blocks each having a plurality of pages, and the flash memory controller comprises:
a buffer, configured for temporarily storing a data unit being transmitted from the electronic device and to be written into the flash memory or the data unit being read from the flash memory; and
a processing circuit, coupled to the buffer, configured for detecting whether the data unit is formed by a repeated pattern, and for making a record of the repeated pattern at a field of a specific table if determining that the data unit is formed by the repeated pattern, wherein the processing circuit is arranged to write information content of the repeated pattern into the field of the specific table if determining that the data unit is formed by the repeated pattern.

15. The flash memory controller of claim 14, wherein the specific table is a logical-to-physical address mapping table within the flash memory.

16. The flash memory controller of claim 14, wherein the processing circuit is configured to stop incrementing a valid page count of a specific block if the data unit formed by the repeated pattern is written into a page of the specific block in the flash memory.

17. The flash memory controller of claim 14, wherein the processing circuit is configured for decrementing a valid page count of a specific block if the data unit formed by the repeated pattern is read from a page of the specific block in the flash memory.

18. The flash memory controller of claim 14, wherein the processing circuit is configured for marking another field of the specific table to indicate that the record of the repeated pattern has been made at the field of the specific table.

19. The flash memory controller of claim 18, wherein the processing circuit is configured for reading the repeated pattern from the field of the specific table to replicate the repeated pattern for regenerating and outputting the data unit to the electronic device if the electronic device requests the data unit; wherein a data size of the repeated pattern is smaller than a data size of the data unit.

20. The flash memory controller of claim 14, wherein the processing circuit is arranged to write information content of the repeated pattern into a memory space different from the specific table if determining that the data unit is formed by the repeated pattern.

21. The flash memory controller of claim 20, wherein the processing circuit is arranged for reading the repeated pattern from the memory space to replicate the repeated pattern for regenerating and outputting the data unit to the electronic device if the electronic device requests the data unit and the field of the specific table indicates the repeated pattern; and, a data size of the repeated pattern is smaller than a data size of the data unit.

22. The flash memory controller of claim 14, wherein the processing circuit is arranged for detecting whether the data unit is formed by the repeated pattern if deciding that the flash memory controller is idle.

23. The flash memory controller of claim 14, wherein the processing circuit is arranged for stopping detecting whether the data unit is formed by the repeated pattern if detecting that the electronic device is arranged to access the flash memory.

24. A flash memory controller coupled between a flash memory and an electronic device, the flash memory having a plurality of blocks each having a plurality of pages, and the flash memory controller comprises:
a buffer, configured for temporarily storing a data unit read from the flash memory; and
a processing circuit, coupled to the buffer, and configured for:
receiving a specific command from the electronic device, the specific command carrying a logical address to request a first data unit;
accessing a field of a specific table to obtain a repeated pattern based on the logical address, the field of the specific table being within the flash memory and used for storing a record of the repeated pattern if the first data unit is formed by the repeated pattern; and
replicating the repeated pattern to regenerate and output the first data unit to the electronic device;
wherein a data size of the repeated pattern obtained from the flash memory is smaller than a data size of the first data unit requested by the electronic device.

25. A flash memory controller coupled between a flash memory and an electronic device, the flash memory having a plurality of blocks each having a plurality of pages, and the flash memory controller comprises:
- a buffer, configured for temporarily storing a data unit which is transmitted from the electronic device and to be written into the flash memory; and
- a processing circuit, coupled to the buffer, configured for detecting whether the data unit is formed by a repeated pattern, and for stopping incrementing a valid page count of a specific block if determining that the data unit is formed by the repeated pattern and is written into a page of the specific block in the flash memory.

26. A flash memory controller coupled between a flash memory and an electronic device, the flash memory having a plurality of blocks each having a plurality of pages, and the flash memory controller comprises:
- a buffer, configured for temporarily storing a data unit which is read from the flash memory; and
- a processing circuit, coupled to the buffer, and configured for detecting whether the data unit is formed by a repeated pattern, and for decrementing a valid page count of a specific block if determining that the data unit, read from a page of the specific block in the flash memory, is formed by the repeated pattern.

* * * * *